United States Patent [19]

Pinkston et al.

[11] Patent Number: 4,751,127

[45] Date of Patent: Jun. 14, 1988

[54] PRINTING BLANKET CONSTRUCTION AND METHOD AND APPARATUS FOR MAKING THE SAME

[75] Inventors: Melvin D. Pinkston; Thomas D. Hower, both of Waynesville, N.C.

[73] Assignee: Day International Corporation, Mich.

[21] Appl. No.: 798,521

[22] Filed: Nov. 15, 1985

[51] Int. Cl.[4] .......................... D06N 7/04; B32B 3/10; B32B 33/00; B41N 9/02

[52] U.S. Cl. .................................... 428/141; 428/138; 428/315.5; 428/409; 428/909; 101/401; 156/209; 156/220

[58] Field of Search ...................... 428/909, 315.5, 138, 428/409, 141, 315.7, 315.9; 101/217, 401; 156/209, 220, 221

[56] References Cited

U.S. PATENT DOCUMENTS

| | | | |
|---|---|---|---|
| 1,778,185 | 10/1930 | DeVries . | |
| 3,025,186 | 3/1962 | Eekhout et al. | 117/139 |
| 3,795,568 | 3/1974 | Rhodarmen et al. | 161/87 |
| 3,881,045 | 4/1975 | Strunk | 428/215 |
| 4,344,996 | 8/1982 | Banks et al. | 428/141 |

FOREIGN PATENT DOCUMENTS

| | | |
|---|---|---|
| 2660483 | 7/1981 | Fed. Rep. of Germany . |

OTHER PUBLICATIONS

FIGS. 6 and 7 of this application for prior known ground and textured printing surfaces.
Use of starch for curing liner release.
Pages 18–20 of the May 1983 issue of EPI.

*Primary Examiner*—John E. Kittle
*Assistant Examiner*—Susan S. Rucker
*Attorney, Agent, or Firm*—Killworth, Gottman, Hagan & Schaeff

[57] ABSTRACT

A printing blanket construction and method and apparatus for making the same are provided, the blanket construction comprising an outer layer formed mainly of polymeric material and having an outer printing surface for carrying liquid printing ink or the like for printing purposes or the like, the outer printing surface having a plurality of separate ink wells interrupting the same in a closely spaced apart generally uniform pattern thereof throughout substantially the entire printing area thereof and with a relatively large number of the wells each having a mouth opening at the printing surface that has a substantially straight-line length across the largest portion thereof of approximately 3 microns to approximately 65 microns.

31 Claims, 8 Drawing Sheets

100 MICRONS

100 MICRONS

PRINTING BLANKET CONSTRUCTION AND METHOD AND APPARATUS FOR MAKING THE SAME

BACKGROUND OF THE INVENTION

1. Field of the Invention

This invention relates to an improved printing blanket construction and to an improved method and apparatus for making a printing blanket construction.

2. Prior Art Statement

It is known to provide a printing blanket construction comprising an outer layer means formed mainly of polymeric material and having an outer printing surface means for carrying liquid printing ink means or the like for printing purposes or the like. For example, see the U.S. Pat. No. 1,778,185, to DeVries; the U.S. Pat. No. 3,025,186, to Eekhout et al; the U.S. Pat. No. 3,795,568, to Rhodarmer et al; the U.S. Pat. No. 3,881,045, to Strunk and the U.S. Pat. No. 4,015,046, to Pinkston et al.

It is also known that the structures of the outer printing surfaces of prior known printing blanket constructions have been controlled by grinding texture therein or by using a curing liner, such as paper, in combination with a dusting material, normally talc, disposed against the uncured surface and then being removed therefrom after the outer layer means has been cured. For example, see FIG. 6 of this application.

After applicants made their invention, applicants were informed through hearsay that it was believed that another utilized starch as the dusting material in combination with the curing liner perhaps on the basis that starch is a good release agent for subsequently removing the curing liner from the cured layer means. However, applicants have found that the starch can not be removed by normal washing of the outer surface of the cured blanket construction so that the printing surface with the non-removed starch provides inferior printing characteristics.

It is also known to provide raised structure, such as a plurality of projections, on the printing surface of a blanket composition to improve the ink carrying and/or paper release characteristics thereof. For example, see German Pat. No. 2,660,483 and pages 18-20 of the May 1983 issue of EPI.

SUMMARY OF THE INVENTION

It is one feature of this invention to provide an improved printing blanket construction that has improved ink carrying and/or improved paper release characteristics.

In particular, it was found according to the teachings of this invention that the outer printing surface means of the outer layer means of a printing blanket construction can have a plurality of separate ink well means interrupting the same in a closely spaced apart generally uniform pattern thereof throughout substantially the entire printing area thereof and with a relatively large number of the well means each having a mouth opening at the printing surface means that has a substantially straight-line length across the largest portion thereof of approximately 3 microns to approximately 65 microns, such a printing blanket construction thereby providing the aforementioned improved ink carrying and/or improved paper release characteristics.

For example, one embodiment of this invention provides a printing blanket construction comprising an outer layer means formed mainly of polymeric material and having an outer printing surface means for carrying liquid printing ink means or the like for printing purposes or the like, the outer printing surface means having a plurality of separate ink well means interrupting the same in a closely spaced apart generally uniform pattern thereof throughout substantially the entire printing area thereof with a relatively large number of the well means each having a mouth opening at the printing surface means that has a substantially straight-line length across the largest portion thereof of approximately 3 microns to approximately 65 microns.

Accordingly, it is an object of this invention to provide an improved printing blanket construction having one or more of the novel features of this invention as set forth above or hereinafter shown or described.

Another object of this invention is to provide an improved method of making a printing blanket construction, the method of this invention having one or more of the novel features of this invention as set forth above or hereinafter shown or described.

Another object of this invention is to provide an improved apparatus for making a printing blanket construction, the apparatus of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figures 1, 2, 10, 11:
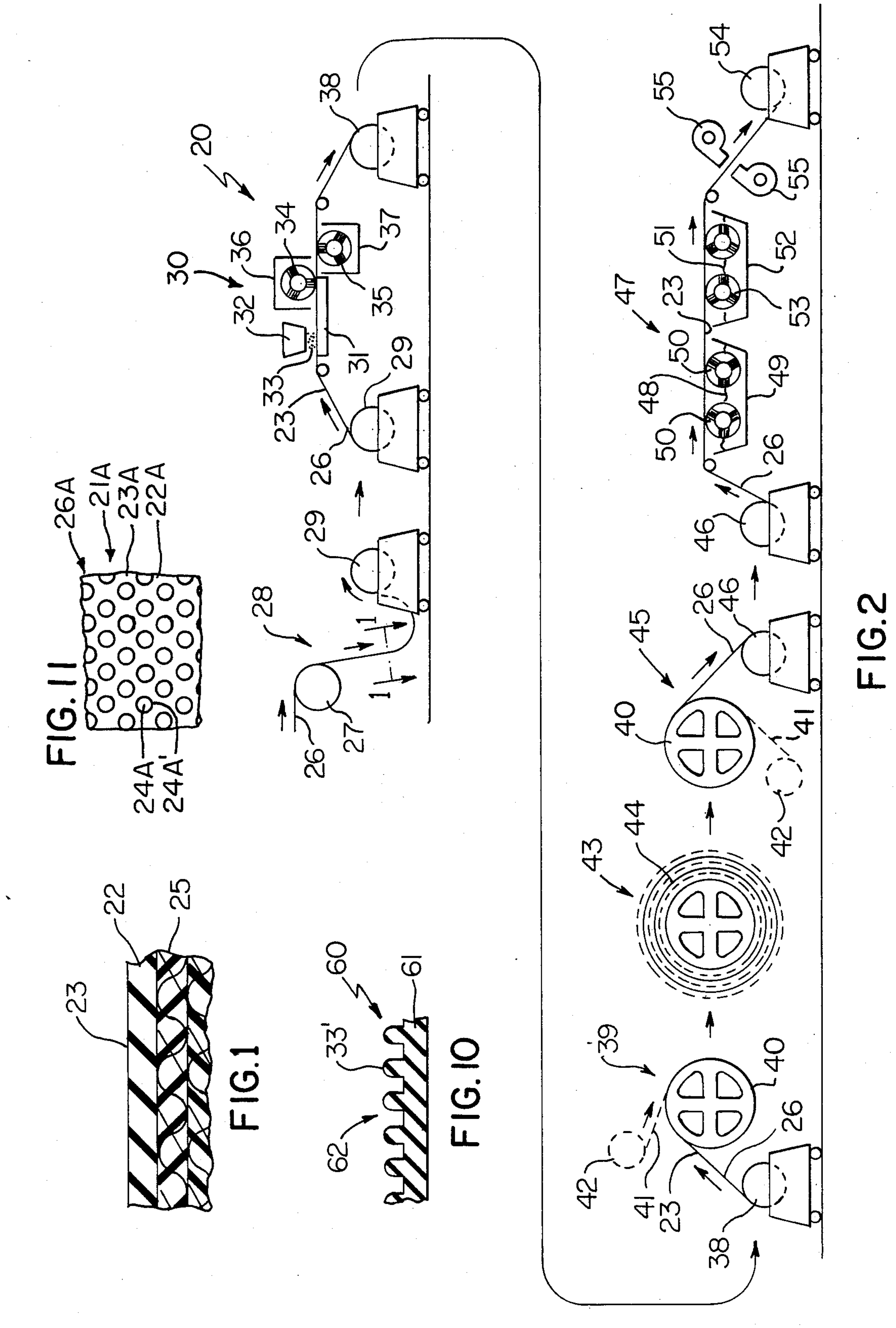
FIG. 1 is an enlarged fragmentary cross-sectional view of a printing blanket construction before the same has been vulcanized or heat cured and before that same has been provided with the ink well means of this invention, FIG. 1 being taken on line 1—1 of FIG. 2.
FIG. 2 is a schematic view of the method and apparatus of this invention for making a printing blanket construction of this invention.
FIG. 10 is an enlarged fragmentary cross-sectional view of a curing liner of this invention for forming ink well means in a printing blanket construction of this invention.
FIG. 11 is a top view of the printing surface of another embodiment of the printing blanket construction of this invention that might be made from the curing liner of FIG. 10.

While the various features of this invention are hereinafter illustrated and described as being particularly adapted to provide a printing blanket construction adapted to print with liquid printing ink means, it is to be understood that the various features of this invention can be used singly or in various combinations thereof to provide a printing blanket construction for transferring other material as desired.

Therefore, this invention is not to be limited to only the embodiments illustrated in the drawings, because the drawings are merely utilized to illustrate one of the wide variety of uses of this invention.

Figure 3:
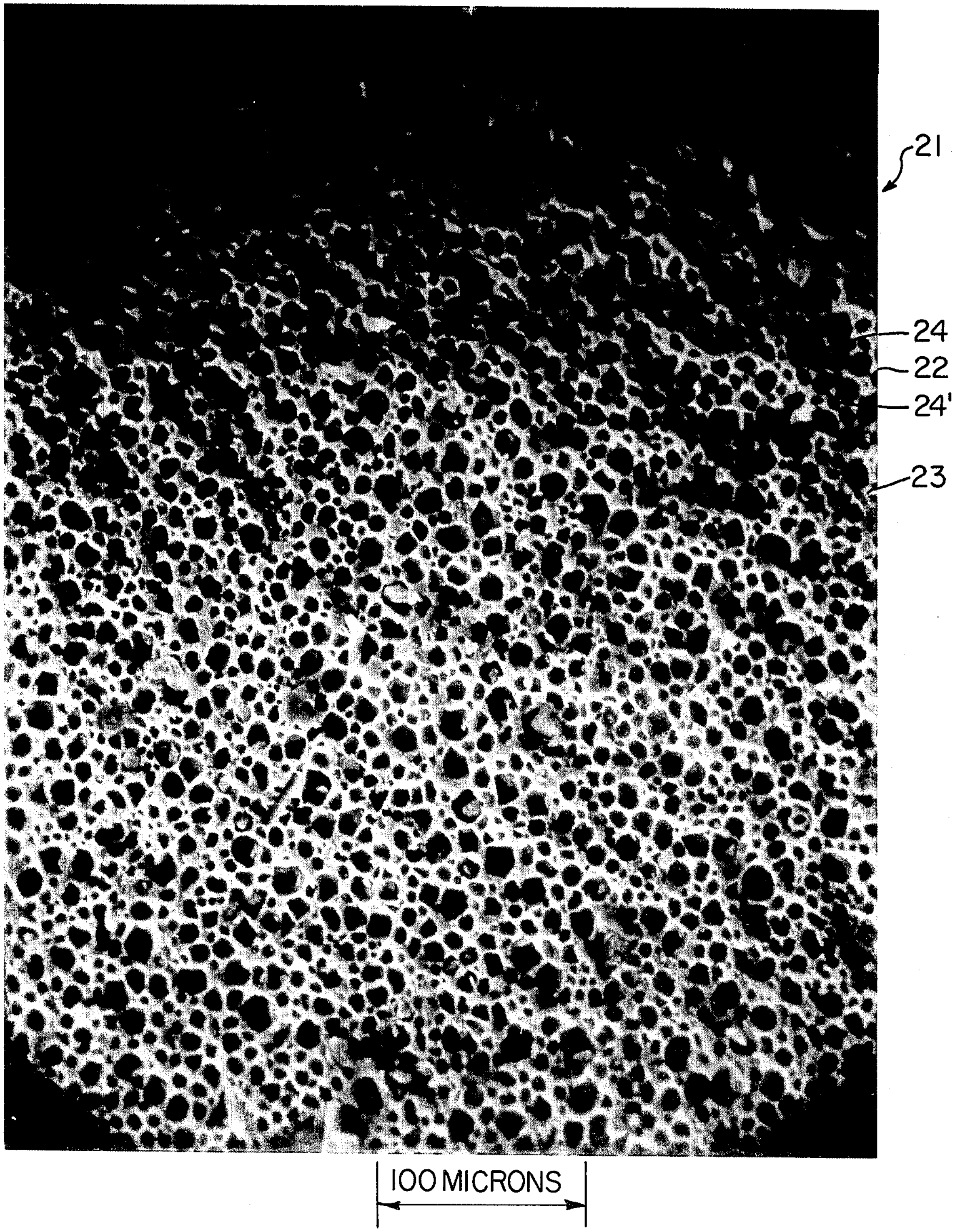
FIG. 3 is an enlarged photograph of the printing surface of a printing blanket construction of this invention.

Referring now to FIG. 2, one method and apparatus of this invention is generally indicated by the reference numeral 20 and it is believed that the method and apparatus of FIG. 2 can be utilized to form a printing blanket construction of this invention that is generally indicated by the reference numeral 21 in FIG. 3 and that comprises an outer layer means 22 formed mainly of polymeric material and having an outer printing surface means 23 for carrying liquid printing ink means or the like for printing purposes or the like, the printing blanket construction 21 of this invention having a plurality of separate ink well means 24 interrupting the outer printing surface means 23 thereof in a closely spaced apart generally uniform pattern thereof throughout substantially the entire printing area thereof as fully illustrated in FIG. 3 and with a relatively large number of well means 24 each having a mouth opening 24' at the printing surface means 23 that has a substantially straight-line length across the largest portion thereof of approximately 3 microns to approximately 65 microns.

While it is believed that, in general, the printing blanket construction 21 of this invention can be formed in any conventional manner and from any suitable polymeric material, whether the same is a natural rubber material, a synthetic rubber material, a plastic material, etc. or various combinations thereof as is well known in the art, certain of such materials and methods and apparatus for making the printing blanket construction are disclosed in the aforementioned four U.S. patents, the German patent and the EPI publication whereby these four U.S. Pat. Nos. 1,778,185; 3,025,186; 3,795,568; 3,881,045 and 4,015,046; German Pat. No. 2,660,483 and pages 18-20 of the May, 1983 issue of EPI are being incorporated into this disclosure by this reference thereto.

Therefore, it is well known that a blanket construction is formed by providing an uncured outer polymeric layer means of a desired thickness on an uncured backing structure, such an outer layer means being indicated by the reference numeral 22 in FIG. 1 and the backing material by the reference numeral 25.

In general, one prior known method of making an outer layer means of a blanket construction is by mixing an unvulcanized rubber compound into a suitable solvent and subsequently knife coating the solution onto a fabric carcass in a multiplicity of thin coats. After each coat of solution, the solvent thereof is allowed to evaporate so that the resultant layer of rubber is substantially solvent free.

Some rubber compounds that have been used for forming an outer layer means of a blanket construction in the above manner comprise acrylonitrile-butadiene rubber, isobutyleneisoprene elastomer, polysulfide rubber, ethylene-propylenediene terpolymer, natural rubber, styrene-butadiene rubber, and a blend of acrylonitrile-butadiene and polysulfide rubber.

However, it is to be understood that the outer layer means 22 of this invention can be formed of any suitable polymeric material and in any suitable manner, whether or not the same has been specifically set forth above or has been disclosed in the aforementioned references that have been incorporated into this disclosure, as it is believed that the unique features of this invention are not limited to any one particular material, method or apparatus.

The embodiment of the method and apparatus 20 of this invention that is illustrated in FIG. 2 is adapted to receive the structure of FIG. 1 after the same has been made and is directed in a web form 26 thereof in a substantially continuous manner around a tail drum 27 at a station 28 to be disposed in a coil or roll form as indicated by the reference numeral 28 in FIG. 2. In a typical printing blanket forming operation, the material wound in the roll 29 comprises a web 26 that is approximately 80 to 85 inches wide and approximately 60 yards long.

Subsequently, the roll 29 is moved to a station 30 wherein the web 26 is unwound from the roll 29 and passed over a table 31 with its outer printing surface means 23 facing upwardly so that a conventional dusting hopper 32 can dust particles 33 onto the surface 23.

In prior known methods and apparatus, the dusting particles 33 comprise a suitable release material, such as talc, mica, etc.

However, as will be apparent hereinafter, it was found according to this invention that the particles 33 can comprise particles of starch or any other suitable material of a desired size that will form the ink well means 24 (FIG. 3) as hereinafter set forth.

After the particles 33 have been dusted onto the outer surface means 23 of the web 26, the web 26 passes between rotating brush means 34 and 35 which respectively brush the opposed surfaces of the web 26 to remove any excess particles 33, the brush means 34 and 35 respectively being disposed in suitable vacuum boxes 36 and 37 which are utilized to remove any particles and the like brushed off of the web 26 as the same passes beyond the table 31 as illustrated. At this time, the brushed web 26 is wound up into a roll 38 whereby the rolled web 26 can be stored in the roll form 38 for ambient aging thereof as is well known in the art.

However, it is to be understood that the web 26 could be directly interleaved with a curing liner after the same leaves the brushes 34 and 35 without being ambient aged.

If ambient aging is being utilized, usually the roll 38 is left overnight, approximately 16 hours, so as to stabilize any solvents, etc. that might still be in the web 26 as well as to allow the web 26 to cool.

In any event, the web 26 is unrolled from the roll 38 at station 39 to be wound on reel 40 together with a curing liner 41 that is unwound from a supply roll 42 thereof, the liner 41 being wound with the web 26 in a manner so as to be disposed against the dusted outer surface means 23 thereof whereby the reel 40 has the webs 26 and 41 wound thereon in the interleaved manner as illustrated at station 43 in FIG. 2 wherein the resulting interleaved structure 44 is suitably heated for a suitable period of time to vulcanize or cure the unvulcanized or uncured polymeric material of the web 26 in a conventional manner.

It is to be understood that the curing line 41 can comprise any of the conventional curing liners utilized in the past, such as comprising a paper liner, a cured rubber liner, a plastic film, a metallic liner or even another printing blanket construction that is to be cured with the web 26. However, it is to be understood that this invention is not to be limited to any particular curing liner and it may be found that a curing liner is not necessary.

In any event, heat curing of the interleaved structure 44 can take place in a conventional readily available curing apparatus for a conventional time period and with a conventional cure temperature. It is believed that certain of starch particles 33 become embedded in the surface means 23 during such curing operation.

Thereafter, the heat cured material 26 and 41 are unwound from the reel 40 at station 45 in FIG. 2 so that the cured web 26 can be wound into a roll 46 thereof and the curing liner 41 can be rolled back into a supply roll 42 thereof for reuse thereof in a conventional manner.

The cured web 26 of this invention is then unwound from the roll 46 at a particle removing station 47 of this invention wherein the web 26 has the dusted side 23 thereof treated in such a manner that the particles 33 that have become embedded into the surface means 23 of the outer layer means 22 by the process previously described are removed therefrom and thereby leave the ink well means 24 in the surface means 23 thereof.

For example, it has been found that when the embedded particles 33 comprise starch, the same cannot be removed by normal washing thereof and thereby it has been found according to the teachings of this invention that the embedded starch particles can be washed with a solution of sodium hydroxide that breaks down the starch into a sugar so that the same can be dissolved therefrom by the sodium hydroxide solution.

Therefore, it is believed that the sodium hydroxide solution, indicated by the reference numeral 48 in FIG. 2, can be contained in a suitable reservoir 49 in which one or more brushes 50 rotate and be applied to the surface means 23 of the web 26 so as to remove the embedded particles 33 from the surface means 23 and thereby leave the surface means 23 with the well means 24 interrupting the same because the well means have been formed in the surface means 23 by the particles 33 having become embedded therein through the procedure previously set forth.

Since the sodium hydroxide solution 48 is an alkaline solution, it is desired that the same be neutralized on the surface 23 after the starch particles 33 have been dissolved therefrom. Such neutralizing can be accomplished by applying a hydrogen peroxide solution to the surface 23.

Therefore, it is believed that such a hydrogen peroxide solution, indicated by the reference numeral 51 in FIG. 2, can be contained in a suitable reservoir 52 and be applied to the surface 23 of the web 26 by one or more brushes 53 rotating in the solution 51 and engaging against the side 23 of the web 28.

As the web 26 leaves the reservoir 52 in FIG. 2, the web 26 is formed into a roll 54 thereof. However, before forming the roll 54, any remaining moisture on the opposed sides of the web 26 can be removed. For example, hot air can be blown onto the opposed sides of the web 28 by suitable blowers 55 that are schematically illustrated in FIG. 2. Of course, other drying means can be utilized, if desired.

The web 26 from the roll 54 can be subsequently cut into the desired printing blanket size in a conventional manner to be utilized with conventional printing apparatus (not shown) in a manner well known in the art for printing or the like with the printing blanket construction 21 of this invention performing such printing operation with improved ink carrying and/or paper release characteristics.

In particular, it is believed that the ink well means 24 that interrupt the printing surface 23 of the resulting printing blanket construction 21 of this invention provide such improved ink carrying and/or paper release characteristics in substantially the same manner and for the same reasons as set forth in the aforementioned German patent and EPI publication and therefore need not be further set forth.

Thus, it can be seen that the method and apparatus 20 of this invention is readily adapted to form the plurality of separate ink well means 24 that interrupt the outer printing surface means 23 of the outer layer means 22 of the printing blanket construction 21 with the ink well means 24 being disposed in a closely spaced apart generally uniform pattern thereof throughout substantially the entire printing area thereof and with a relatively large number of the well means 24 each having a mouth opening 24' at the surface means 23 that has a substantially straight-line length across the largest portion thereof of approximately 3 microns to approximately 65 microns as fully illustrated in FIG. 3.

Depending upon the shapes and sizes of the starch particles 33 that have been embedded into the surface means 23 of the outer layer means 22 of the web 26 and then having been subsequently removed therefrom, as well as depending upon the compacting force and thickness of the layer of particles 33, each well means 24 can have a depth into the layer means 22 that is different from the depth of the other well means 24 whereby at least some of the well means 24 can each have a depth in the surface means 23 that is shorter than the largest length across the mouth opening 24' thereof, at least some of the well means 24 can each have a depth in the surface means 23 that is at least the same as the largest straight-line length across the mouth opening 24' thereof, and at least some of the well means 24 can have a depth in the surface means 23 that is longer than the largest length across the mouth opening 24' thereof. Alternately, each of such wells 24 can have a depth shorter than, the same as or longer than the largest straight-line length across the largest portion of the mouth opening 24' thereof, as desired.

Further, depending upon the sizes and shapes of the starch particles 33 that become embedded in the surface means 23 of the layer means 22 of the web 24 in the manner previously described, it can be seen from FIG. 3 that the longest length across some of the mouth openings 24' of the well means 24 vary throughout the pattern of the well means 24 on the printing blanket construction 21 and that the mouth openings 24' of at least some of the well means 24 have non-uniform configurations that are randomly disposed throughout the pattern of the well means 24 on the printing blanket construction 21.

It is believed that the above ink well features can be controlled by suitable screening of the starch particles 33 through certain sized screens so that at least the size of the largest starch particles 33 used for forming the ink well means 24 will be established. For example, when forming the printing blanket construction 21 of FIG. 3, conventional corn starch was used and such corn starch had been screened through a screen wherein the mesh openings were each approximately 20 to 22 microns in size.

As is well known in the printing art, ink in the shape of circular dots is transferred to the printing surface 23 of a printing blanket construction to thereby be printed from the printing blanket construction onto the desired material, such as paper, and the ink dots are known as "printer's dots" with each having a particular diameter, such as a diameter of approximately 125 microns or less. For example, one of the smallest conventional printer's dots has a diameter of approximately 50 microns.

Accordingly, in one embodiment of this invention, the starch particles 33 that were used in the duster 32 of FIG. 2 had been screened so that the average ink well means 24 that is formed in the resulting printing blanket construction 21 has the largest straight-line length across the mouth opening 24' thereof of approximately 10 microns whereby this ensures that a plurality of the larger sized ink well means 24 will be disposed in generally an aligned arrangement thereof along the diameter of each conventional printer's dot of ink means that is to be applied to the printing surface means 24 for a printing purpose or the like, and this would be the case even when the diameter of the printer's dot is approximately 125 microns as the number of such aligned ink well means would be approximately 10.

As previously stated, it has been found that such a printing blanket construction 21 having the ink well means 24 with the average mouth opening size being approximately 10 microns as previously described has improved ink carrying characteristics as well as improved paper release characteristics over a similar printing blanket construction that is formed in exactly the same manner as the printing blanket construction of this invention but does not have the ink well means 24 of this invention formed therein. It may be that the ink well means 24 of this invention improve such characteristics in a manner similar to the improvement described in the aforementioned May, 1983 EPI article.

In any event, it is believed according to the teachings of this invention that the most desirable average size of a relatively large number of the ink well means interrupting the printing surface of the outer layer means of a printing blanket construction should have the straight-line length across the largest portion thereof of approximately 3 microns to approximately 65 microns.

It is also believed according to the teachings of this invention that any particles of material that have the desired particle shape and size and do not appreciably change size and shape when exposed to the material of the outer layer means of the blanket construction or residual solvent frequently present therein and to the temperature required to vulcanize or cure the polymeric material can be utilized for the dusting particles 33 previously described.

It is also believed according to this invention that the shape of the particles 33 could be any desired shape, such as spherical, square, rectangular, trapezoidal, pyramidal etc. and that the same could be relatively non-uniform or uniform as desired.

It is also believed that a list of materials that would not melt or dissolve during the processing of a printing blanket construction is large and some such materials that might be utilized could comprise glass, ceramic or plastic spheres, various crystalline salts, starch, sugar, etc. In fact, it is believed that almost any particulated material that is not absorbed into the material of the outer layer means of the printing blanket construction and that can be removed efficiently therefrom would be suitable.

While the method of removing the starch particles 33 has been previously described as a dissolving step, it is to be understood that the dissolving solvent must be one that does not destroy or degrade the material of the outer layer means of the printing blanket construction.

However, it is also believed that other acceptable methods of removal might be mechanical brushing, air jet removal, etc.

Referring now to FIG. 3, the particular embodiment of the printing blanket construction 21 of this invention that is shown therein has the outer layer means 22 thereof formed of a blend of acrylonitrile-butadiene and polysulfide rubber and was formed by dusting the printing surface 23 of the outer layer means 22 thereof with corn starch sold as "OMC 320 Spray Powder" by the Ortman/McCain Co. Such powder is believed to have been screened by the supplier thereof so that the largest particles 33 thereof were no larger than approximately 20 to 22 microns across the largest dimension thereof. However, before utilizing such particles 33 in the duster 32 of this invention, the particles 33 were passed through a 325 mesh screen to remove any clumps and the like that were formed in the powder during the storage of the same in the fifty pound container thereof.

Figure 4:
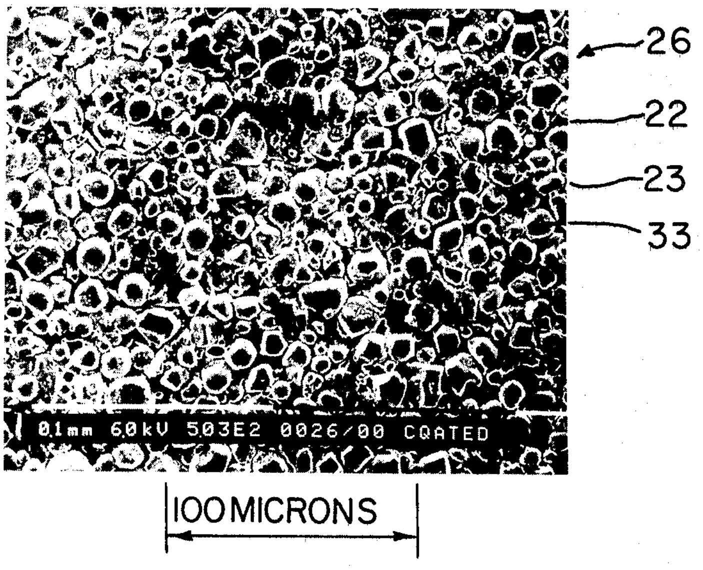
FIG. 4 is an enlarged photograph of the printing blanket construction of this invention after the same has had starch dusted thereon and been heat cured but before the same has the ink well means formed therein by the method of this invention.

After such a printing blanket construction had been vulcanized or heat cured in the manner previously set forth and as illustrated in FIG. 2, but before the particles 33 have been removed, the printing surface 23 thereof is shown in FIG. 4 and has the individual particles 33 on the outer layer means 22 thereof.

Such cured printing blanket web 26 of FIG. 4 was then hand washed with a cloth containing a 5% solution of sodium hydroxide which resulted in the dissolving of the particles 33 as it is believed that such 5% solution of sodium hydroxide changed in the starch particles 33 to sugar and then dissolved the sugar into the solution thereof so as to provide the ink well means 24 as fully shown in FIG. 3. However, in order to neutralize any caustic solution that might still remain on the printing surface 23, a cloth with 5% solution of hydrogen peroxide contained therein was wiped by hand over the printing surface 23 subsequent to the washing operation with the 5% solution of sodium hydroxide.

Figure 5:
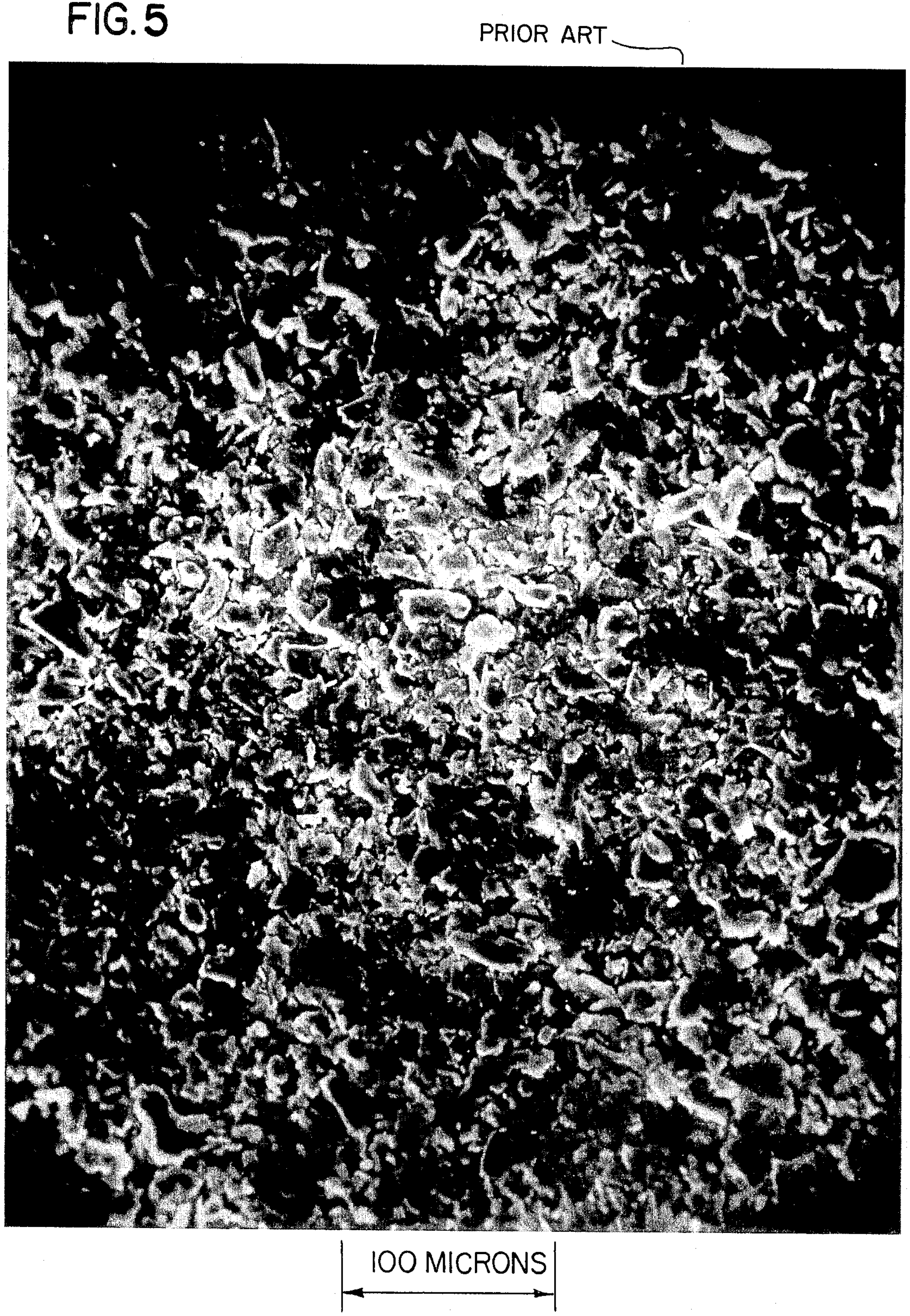
FIG. 5 PRIOR ART
FIG. 5 is an enlarged photograph of the printing surface of a prior known blanket construction, the printing surface having been dusted with talc and been heat cured but before the talc had been washed from the printing surface.
Figure 6:
FIG. 6 PRIOR ART
FIG. 6 is an enlarged photograph of the prior known printing blanket construction of FIG. 5, the printing surface having been washed to remove the talc thereon.

In order to fully illustrate the uniqueness of the generally uniform pattern that is provided by closely spaced apart ink well means 24 of this invention as provided in FIG. 3, reference is now made to FIG. 5 wherein the enlarged photograph thereof is on the same scale of enlargement as the photographs of FIGS. 3 and 4 and illustrates a printing blanket construction wherein the printing surface thereof had been dusted by talc in an apparatus similar to FIG. 2 for curing liner release purposes and after the same had been heat cured but before the printing surface had been washed in the normal manner. However, FIG. 6 is an enlarged photograph on the same scale of enlargement as the photographs of FIGS. 3–5 and illustrates the washed printing surface of the previously talced printing surface so that while a few random parts thereof may be considered as ink well means, it can be seen that the same are not disposed in a closely spaced apart generally uniform pattern thereof throughout substantially the entire printing area as fully provided by the ink well means 24 of this invention as shown in FIG. 3.

Figure 7:
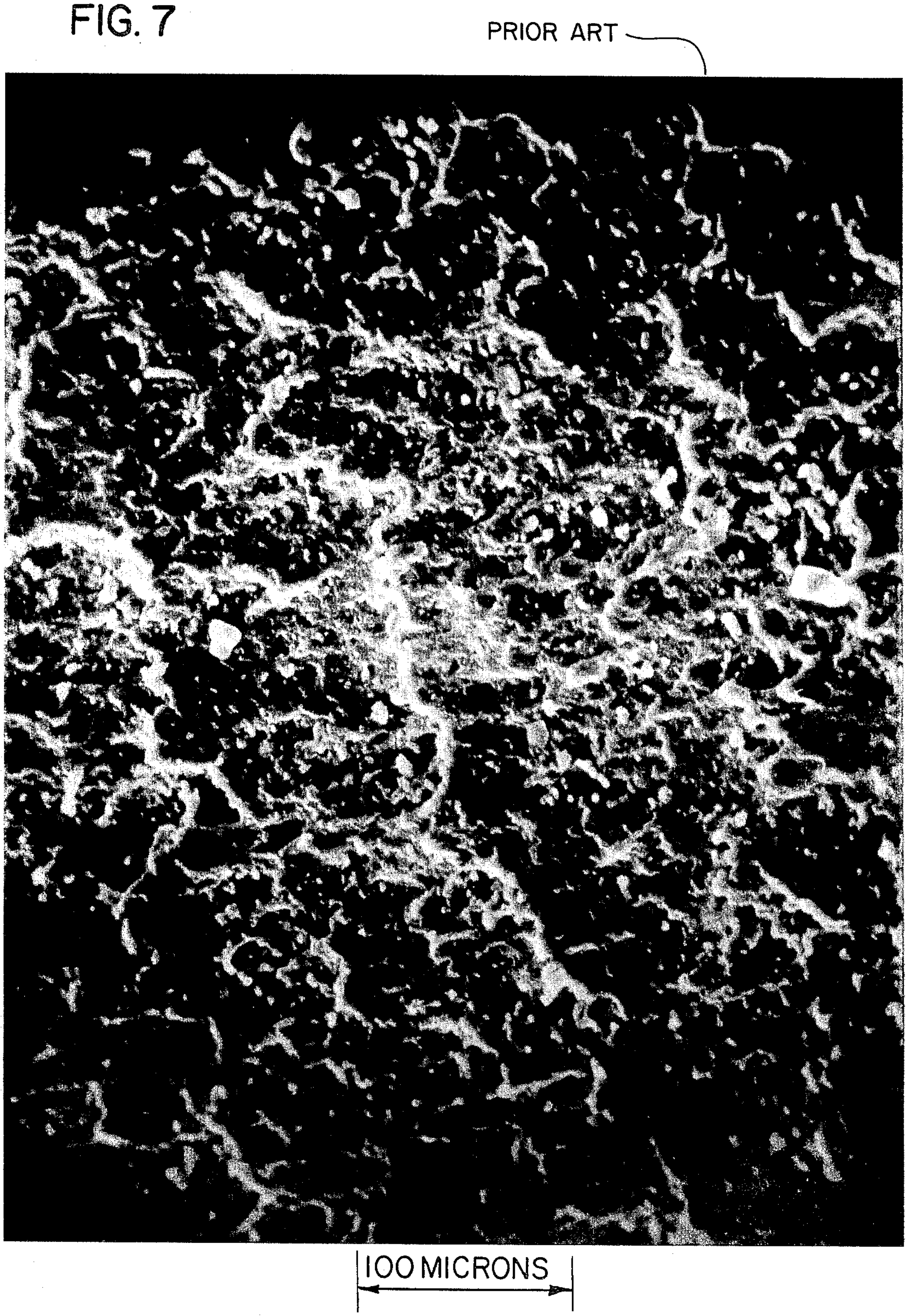
FIG. 7 PRIOR ART
FIG. 7 is an enlarged photograph of the printing surface of another prior known printing blanket construction wherein the printing surface thereof has been ground.

FIG. 7 is an enlarged photograph on the same scale as the photographs of FIGS. 3–6 and shows the printing surface of a prior known printing blanket construction wherein the printing surface has been ground in a manner well known in the art to provide a textured printing surface that might be considered as having various random ink well means provided therein. However, it can readily be seen from FIG. 7 that any ink well means formed therein by the grinding process obviously do not comprise a plurality of separate ink well means interrupting the printing surface means in a closely spaced apart generally uniform pattern throughout substantially the entire printing area thereof in the manner provided by the ink well means 24 of this invention as shown in FIG. 3.

Figure 8:
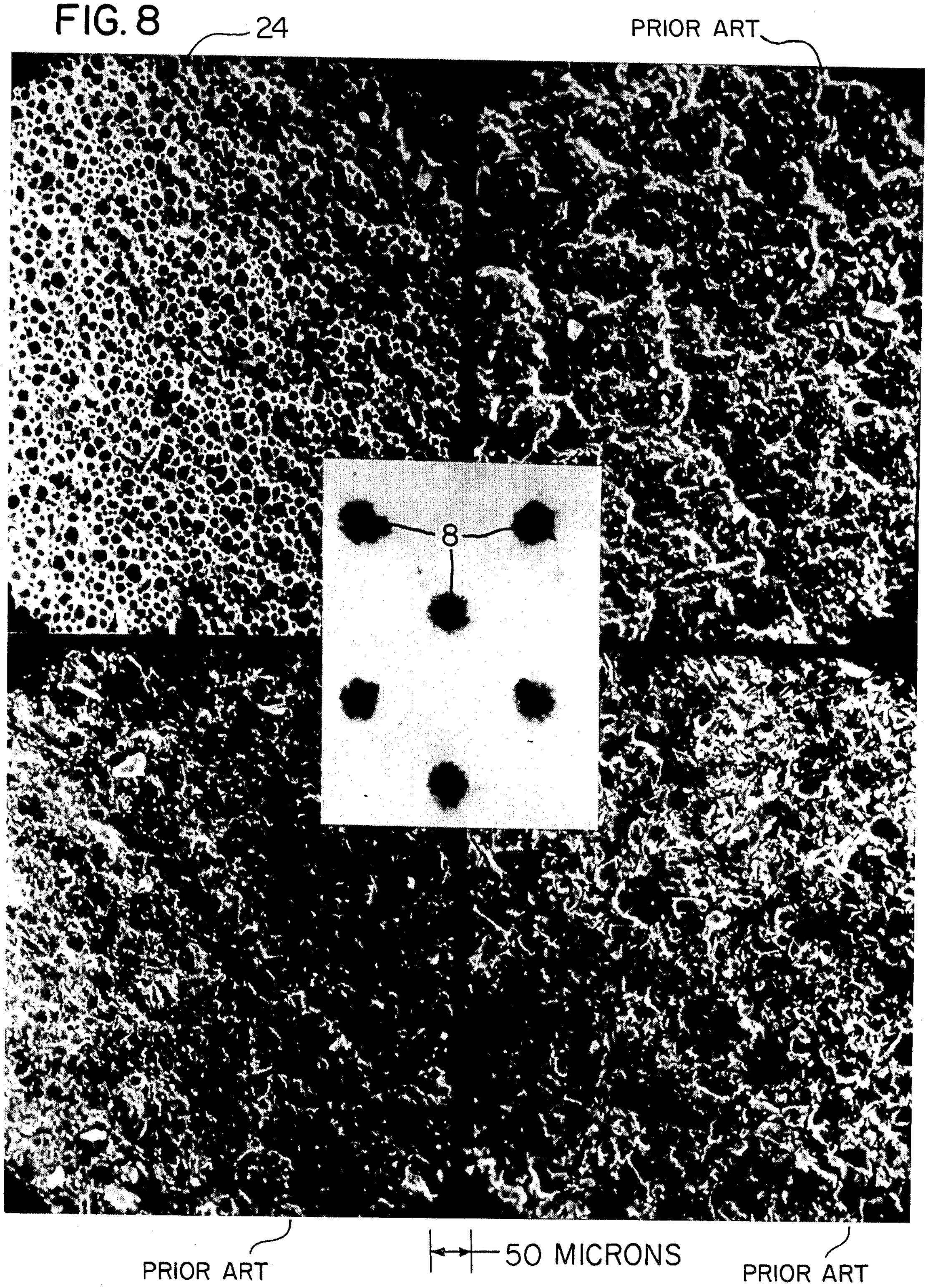
FIG. 8 is an enlarged photograph of the printing surfaces of four printing blanket constructions with a card superimposed on the four adjacent corners thereof that shows the relative size of conventional printer's dots wherein each dot has a diameter of approximately 50 microns, the printing surface in the upper left hand corner of FIG. 8 comprising the printing blanket of this invention that is set forth in FIG. 3, the printing surface in the upper right hand corner of FIG. 8 comprising the prior known printing blanket of FIG. 7, the printing surface in the lower right hand corner of FIG. 8 comprising the prior known printing surface of FIG. 5, and the printing surface in the lower left hand corner of FIG. 8 comprising the prior known printing blanket of FIG. 6.

In order to fully appreciate the general uniformity of the pattern provided by a relatively large number of the larger ink well means 24 of this invention in the printing surface 23 of the printing blanket construction 21 of this invention as shown in the photograph of FIG. 3, the photographs of FIGS. 3, 7, 5 and 6 have been grouped together in the photograph of FIG. 8 on a reduced scale of approximately 50% together with a card superimposed on the adjacent corners thereof that have conventional printer's dots 8 printed thereon with each dot 8 having a diameter of approximately 50 microns in length. Thus, it can be seen from the photograph of FIG. 8 that the pattern of the ink well means 24 of the blanket construction of this invention as shown in the photographs of FIGS. 3 and 8 is adapted to provide a plurality of a relatively large number of the larger ink well means 24 thereof in generally an aligned arrangement thereof that will be disposed along the diameter of each conventional printer's dot of ink means that would be applied to the printing surface means for a printing purpose and when the printer's dots 8 each has a diameter of approximately 50 microns in length.

Figure 9:
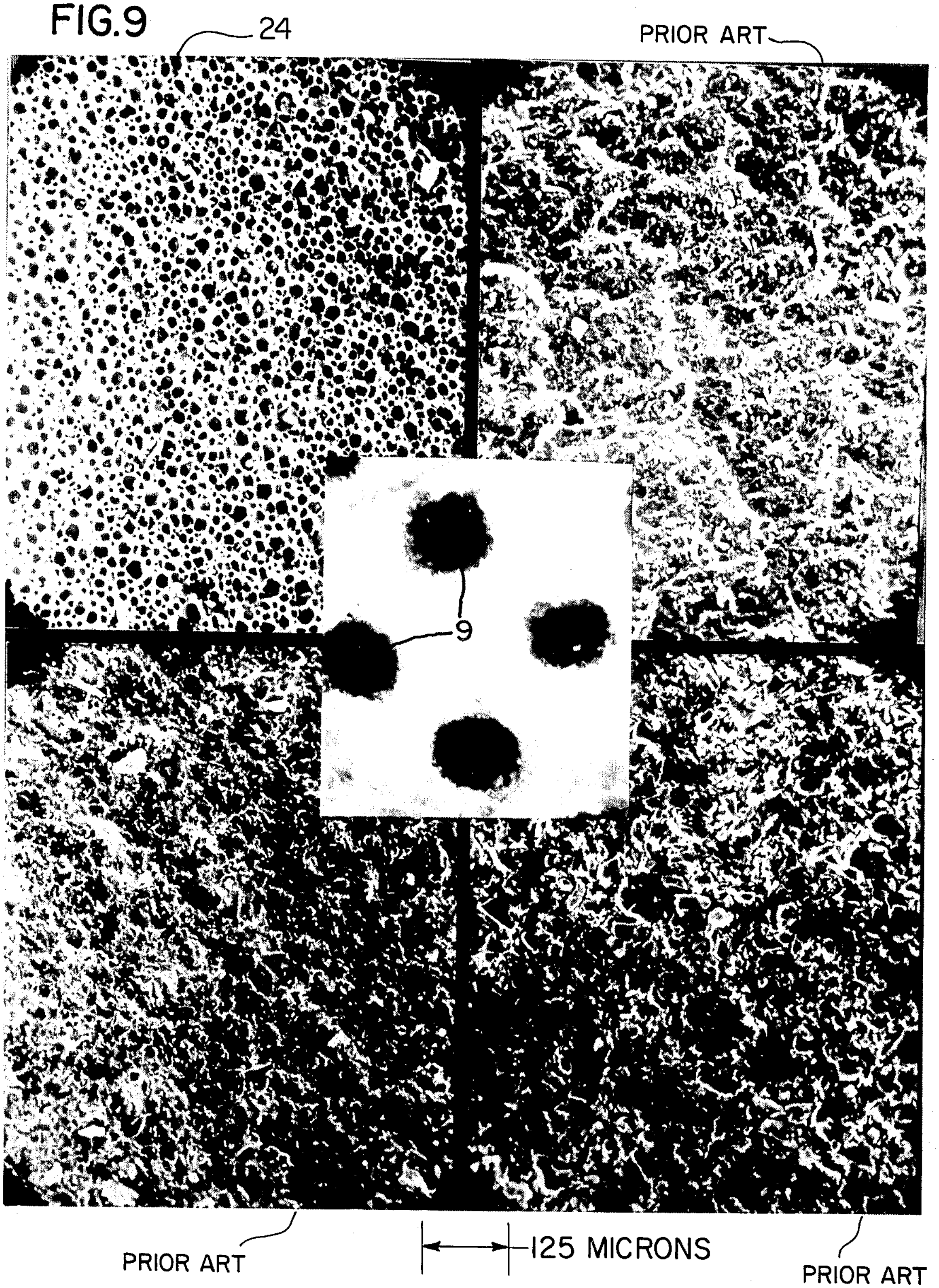
FIG. 9 is similar to FIG. 8 and is an enlarged photograph of the printing surfaces of the same four printing blanket constructions of FIG. 8 with a card superimposed on the four adjacent corners thereof that shows the relative size of conventional printer's dots wherein each dot has a diameter of approximately 125 microns, the printing surface in the upper left hand corner of FIG. 9 comprising the printing blanket of this invention that is set forth in FIG. 3, the printing surface in the upper right hand corner of FIG. 9 comprising the prior known printing blanket of FIG. 7, the printing surface in the lower right hand corner of FIG. 9 comprising the prior known printing surface of FIG. 5, and the printing surface in the lower lefthand corner of FIG. 9 comprising the prior known printing blanket of FIG. 6.

Similarly, it can be seen from the photograph of FIG. 9 wherein the card superimposed on the same photographs of FIG. 8 and having thereon printer's dots 9 each with a diameter of approximately 125 microns in length, the pattern of the ink well means 24 in the printing surface of the outer layer means of the printing blanket construction of this invention is illustrated in FIGS. 3 and 9 will still provide a plurality of the relatively large number of larger ink well means in generally an aligned arrangement thereof along the diameter of each conventional printer's dot 9 of ink means that is to be applied to the printing surface means thereof for printing purposes or the like with each conventional printer's dot having a diameter of approximately 125 microns in length.

In addition, it is believed according to the teachings of this invention that the particles 33 could actually comprise projection means that have been embossed or otherwise formed on a release film, paper or other curing liner, such pattern having been embossed with a mirror image of the desired pattern for the ink well means 24 and such an image reverse texture would have good release characteristics suitable for vulcanizing such liner with the printing blanket construction so as to be easily subsequently separated therefrom.

For example, reference is now made to FIG. 10 wherein a curing liner means of this invention is generally indicated by the reference numeral 60 and comprises a suitable web of cured polymeric material 61 having an outer surface 62 thereof embossed with a mirror image of the desired pattern for forming the ink well means 24A, FIG. 11, so that a plurality of projection means 33′ extend outwardly therefrom which will respectively form the individual ink well means 24A in the printing surface 23A of the outer layer means 22A of the printing blanket construction 21A of FIG. 11.

In this manner, the projection means 33′ on the web 60 can all be uniform relative to each other and can be disposed in a uniform pattern over the surface 62 thereof so that when the liner means 60 is wound with the web 26 at station 39 in FIG. 2 in place of the liner means 41, it is believed that the projection means 33′ will interrupt the printing surface means 23A of the web 26A during the subsequent vulcanizing at the station 43. Thus, it is believed that the subsequent separation of the curing liner 61 from the vulcanized web 26A at the station 45 will provide the completed printing blanket construction without requiring a removing operation at the station 47 because merely removing the web 60 from the printing blanket web 26A might result in the ink well means 24A having been formed in the printing surface means 23A of the web 26A whereby the largest lengths of the resulting mouth openings 24A′ of the well means 24 would be substantially the same and the mouth openings 24A′ of the well means 24A would have substantially uniform configurations relative to each other that are substantially uniformly disposed throughout the pattern on the printing blanket construction 21A as illustrated in FIG. 11.

Thus, it can be seen that this invention not only provides an improved printing blanket construction, but also this invention provides improved methods and apparatus for making such a printing blanket construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and set forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A printing blanket construction including an outer layer, said outer layer having a printing surface for carrying printing ink, said printing surface having a plurality of separate ink well means interrupting said printing surface in a closely spaced apart generally uniform pattern thereof throughout substantially the entire printing area thereof and with a relatively large number of said ink well means each having a mouth opening at said printing surface having a substantially straight-line length across the largest portion thereof of approximately 3 microns to approximately 65 microns.

2. A printing blanket construction as set forth in claim 1 wherein at least some of said ink well means have a depth in said printing surface that is shorter than said length of said mouth opening thereof.

3. A printing blanket construction as set forth in claim 1 wherein at least some of said ink well means have a depth in said printing surface that is approximately the same as said length of said mouth opening thereof.

4. A printing blanket construction as set forth in claim 1 wherein at least some of said ink well means have a depth in said surface means that is longer than said length of said mouth opening thereof.

5. A printing blanket construction as set forth in claim 1 wherein said mouth openings of said ink well means have non-uniform configurations throughout said pattern.

6. A printing blanket construction as set forth in claim 5 wherein said non-uniform configurations of said mouth openings of said ink well means are randomly disposed throughout said pattern.

7. A printing blanket construction as set forth in claim 1 wherein said lengths of said mouth openings of said ink well means are substantially the same.

8. A printing blanket construction as set forth in claim 7 wherein said mouth openings of said ink well means have substantially uniform configurations.

9. A printing blanket construction as set forth in claim 4 wherein said uniform configurations of said mouth openings of said ink well means are substantially uniformly disposed throughout said pattern.

10. A printing blanket construction as set forth in claim 1 wherein said ink well means have been formed by a plurality of projection means having been embedded into said printing surface and then having been removed therefrom.

11. A printing blanket construction as set forth in claim 10 wherein said projection means comprise a plurality of particles.

12. A printing blanket construction as set forth in claim 1 wherein said pattern is adapted to provide a plurality of ink well means in a generally aligned arrangement along the diamteter of each printer's dot of ink that is to be applied to said printing surface.

13. A printing blanket construction as set forth in claim 12 wherein the diameter of said printer's dot is approximately 125 microns.

14. A printing blanket construction as set forth in claim 13 wherein the number of said ink well means along said diameter of said printer's dot is approximately ten.

15. A printing blanket construction as set forth in claim 13 wherein the diameter of said printer's dot is approximately 50 microns.

16. A printing blanket construction as set forth in claim 15 wherein the average length of said largest portion of said mouth openings of said ink well means is approximately ten microns.

17. A printing blanket construction including an outer layer, said outer layer having a printing surface for carrying printing ink, said printing surface having a plurality of separate ink well means interrupting said printing surface in a closely spaced apart generally uniform pattern thereof throughout substantially the entire printing area thereof and with a relatively large number of said ink well means each having a mouth opening at said printing surface having a substantially straight-line length across the largest portion thereof of approximately 3 microns to approximately 65 microns, said ink well means having been formed by a plurality of starch particles having been embedded into said printing surface and then having been removed therefrom by chemically reacting said starch and converting it into more soluble compounds which are dissolved from said printing surface.

18. A printing blanket construction as set forth in claim 17 whereby said outer layer has been heat cured, said particles having been disposed on said printing surface and having been removed therefrom after said outer layer has been heat cured.

19. A method of making a printing blanket construction including the steps of forming an outer layer of said construction having a printing surface thereon, said printing surface being formed by the steps of embedding a plurality of projection means into said outer layer and then chemically or mechanically removing said projection means therefrom in a manner which does not destroy or degrade said printing surface to form a closely spaced apart generally uniform pattern of ink well means over substantially the entire printing surface of said printing blanket construction.

20. A method of making a printing blanket construction as set forth in claim 19 in which each of said ink well means has a mouth opening at said printing surface having a substantially straight-line length across the largest portion thereof of about 3 to 65 microns.

21. A method of making a printing blanket construction as set forth in claim 19 including the step of forming at least some of said ink well means to each have a depth in said printing surface that is shorter than said length of said mouth opening thereof.

22. A method of making a printing blanket construction as set forth in claim 19 including the step of forming at least some of said ink well means to each have a depth in said printing surface that is approximately the same as said length of said mouth opening thereof.

23. A method of making a printing blanket construction as set forth in claim 19 in which said projection means comprise a plurality of particles.

24. A method of making a printing blanket construction as set forth in claim 19 wherein said step of forming said ink well means causes said pattern to be adapted to provide a plurality of said ink well means in a generally aligned arrangement along the diameter of a conventional printer's dot of ink that is to be applied to said printing surface.

25. A method of making a printing blanket construction as set forth in claim 24 wherein the diameter of said printer's dot is approximately 125 microns.

26. A method of making a printing blanket construction as set forth in claim 25 wherein the step of forming said ink well means causes the number of said ink well means along said diameter of said printer's dot to be approximately ten.

27. A method of making a printing blanket construction as set forth in claim 26 wherein the diameter of said printer's ink is approximately 50 microns.

28. A method of making a printing blanket construction as set forth in claim 27 wherein the step of forming said ink well means causes the average length of said largest portion of said mouth openings of said ink well means to be approximately ten microns.

29. A method of making a printing blanket construction including the steps of forming an outer layer of said construction having a printing surface thereon, said printing surface being formed by the steps of embedding a plurality of particles of starch into said outer layer and then removing said particles of starch therefrom by chemically reacting said starch particles with an alkaline solution to convert said starch into more soluble compounds, and then washing said soluble compounds from said printing surface.

30. A method of making a printing blanket construction as set forth in claim 29 including the step of heat curing said outer layer, said step of embedding said starch particles comprising disposing said starch particles on said printing surface before said outer layer has been heat cured, and said step of removing said starch particles taking place after said outer layer has been heat cured.

31. A method of making a printing blanket construction as set forth in claim 29 further including the step of removing said alkaline solution on said printing surface after said soluble composition has been removed.

* * * * *